US005638038A

United States Patent [19]

Suzuki et al.

[11] Patent Number: 5,638,038

[45] Date of Patent: Jun. 10, 1997

[54] SWITCH INCLUDING BREAKER

[75] Inventors: Kazuo Suzuki; Shinji Sasaki, both of Miyagi-ken, Japan

[73] Assignee: Alps Electric, Co., Ltd., Tokyo, Japan

[21] Appl. No.: 558,369

[22] Filed: Nov. 16, 1995

[30] Foreign Application Priority Data

Nov. 18, 1994 [JP] Japan .................................... 6-285219

[51] Int. Cl.[6] .................................................... H01M 75/00

[52] U.S. Cl. .................................................. 335/6; 335/35

[58] Field of Search .................................. 335/6–10, 132, 335/35, 167–176, 202; 361/160, 161, 166, 170, 175, 187, 190, 195–6, 93–4, 100–2

[56] References Cited

U.S. PATENT DOCUMENTS

| | | | |
|---|---|---|---|
| 4,714,907 | 12/1987 | Bartolo et al. | 335/35 |
| 5,247,205 | 9/1993 | Mototani et al. | 307/66 |
| 5,410,442 | 4/1995 | Pohl et al. | 361/169 |
| 5,416,291 | 5/1995 | Venzke . | |
| 5,416,455 | 5/1995 | Moldovan et al. . | |
| 5,418,343 | 5/1995 | Faber et al. . | |

*Primary Examiner*—Lincoln Donovan
*Attorney, Agent, or Firm*—Guy W. Shoup; Patrick T. Bever

[57] ABSTRACT

A switch including a breaker, the size and cost of which can be reduced is provided, the switch including a breaker having a structure such that a mechanical switch for turning an electric circuit on/off includes a breaker for interrupting the electric circuit. Moveable contacts arranged to approach and move apart from fixed contacts are elastically urged in a direction where the moveable contacts move apart from the fixed contacts. When the breaker is set, the moveable contacts are located apart from the fixed contacts in such a manner that a short distance is maintained. By switching the mechanical switch on, a solenoid is operated to bring the moveable contacts into contact with the fixed contacts. When the breaker is operated, the elastic urging force is suspended to move the moveable contacts apart from the fixed contacts for a distance longer than a distance for which the moveable contacts are located apart from the fixed contacts when the mechanical switch is switched off.

10 Claims, 7 Drawing Sheets

SWITCH INCLUDING BREAKER

BACKGROUND OF THE INVENTION

1. Field of the Invention

The present invention relates to a switch including a breaker such that a switch for turning an electric circuit on/off includes a breaker for interrupting the electric circuit.

2. Description of the Prior Art

An apparatus including an electric circuit, which is operated by a power source, and a load, the operation of which is controlled by the electric circuit, has a structure of a type employed widely and provided with, in addition to a switch for turning the electric circuit on/off, a breaker for preventing generation of an excess current due to a malfunction or a failure of the electric circuit and heat caused from the excess current.

In an electric car having a conventional control circuit, a mechanical switch 4 for turning an operating circuit 3 on/off is, an example of which is arranged as illustrated in a block diagram shown in FIG. 9, connected to a DC power source 1 through a breaker 2. A load 5 is connected to the operating circuit 3 through the foregoing mechanical switch 4. As a result, if the load 5 is, for example, short-circuited, the breaker 2 is instantaneously operated to interrupt the electric current from the DC power source 1 so that generation of heat due to flow of an electric current exceeding a rated value from the power source is prevented to improve the reliability.

However, the foregoing conventional structure arranged such that the breaker 2 and the switch 4 for the operating circuit 3 are disposed individually inevitably encounters undesirable enlargement of the overall size. Moreover, since the contact for the breaker 2 and that for the switch 4 are provided independently, the cost cannot be reduced.

SUMMARY OF THE INVENTION

In view of the foregoing, a first object of the present invention is to provide a switch including a breaker which exhibits small size, simple structure and low cost as compared with a conventional structure in which a breaker and a mechanical switch, which are individually prepared, are combined to each other.

A second object of the present invention is to provide a switch including a breaker which is structured such that, if an arc flies in a mechanical switch thereof, then a semiconductor switch is immediately switched on to prevent further generation of an arc in the mechanical switch.

A third object of the present invention is to provide a switch including a breaker which is structured such that the distance between contacts, realized when the breaker is turned off, is made to be long and the distance, realized when the mechanical switch is switched off, is made to be short so that the interrupting performance of the breaker is improved and electric power required to switch the mechanical switch on/off is reduced to decrease electric power consumption.

A fourth object of the present invention is to provide a switch including a breaker which is structured in such a manner that an arc generated between contact electrodes, when the switch including a breaker is operated as a breaker, can be allowed to flow outwardly through a conductive plate so that generation of an arc, when the breaker is operated, is reliably prevented and, thus, damage due to an arc generated between the contact electrodes is prevented.

A fifth object of the present invention is to provide a switch including a breaker which is able to prevent damage occurring due to commutation of a strong electric current into the semiconductor switch.

A sixth object of the present invention is to provide a switch including a breaker which is capable of controlling time taking for the breaker to interrupt the electric circuit in accordance with the value of the electric current.

The first object can be achieved by a first means comprising contacts commonly serving as contacts for turning an electric circuit on/off and contacts for interrupting the electric circuit.

The second object can be achieved by a second means according to the first means, wherein the switch consists of a mechanical switch and a semiconductor switch connected in parallel to the mechanical switch.

The third object can be achieved by a third means according to the first and second means, wherein the distance between the contacts of the breaker, realized when the breaker is operated, is set to be longer than the distance between the contacts of the switch, realized when the switch is switched off.

The fourth object can be achieved by a fourth means according to the first and second means, wherein a plurality of arc-extinguishing conductor plates are disposed between the contacts which are located when the breaker is turned off.

The fifth object can be achieved by a fifth means according to the second means, wherein the semiconductor switch is synchronously switched off when the breaker is turned off.

The sixth object can be achieved by a sixth means according to the first means, further comprising: first suspending means consisting of latch means for maintaining a state where the breaker is turned on and bimetal means disposed in a current passage for the latch means and arranged to be deformed due to a flowing electric current so as to suspend a latching operation of the latch means; and second suspending means formed by an electromagnet which is urged by the electric current flowing through the current passage to suspend the latching operation of the latch means, wherein latching of the breaker is suspended by two methods consisting of a method in which latching is suspended by the first suspending means and a method in which latching is suspended by the second suspending means.

Since the first means comprises the common contacts for the breaker and the mechanical switch, a switch including a breaker can be provided which exhibits small size, simple structure and low cost as compared with a conventional structure in which a breaker and a mechanical switch, which are individually prepared, are combined to each other.

With the second means, if an arc flies in a mechanical switch thereof, then a semiconductor switch is immediately switched on to prevent further generation of an arc in the mechanical switch.

Since the third means has the structure that the distance between contacts, realized when the breaker is turned off, is made to be long and the distance, realized when the mechanical switch is switched off, is made to be short so that the interrupting performance of the breaker is improved and electric power required to switch the mechanical switch on/off is reduced to decrease electric power consumption.

Since the fourth means is structured in such a manner that an arc generated between contact electrodes when the switch including a breaker is operated as a breaker can be allowed to flow outwardly through the conductive plate so that generation of an arc, when the breaker is operated, is reliably prevented and, thus, damage due to an arc generated between the contact electrodes is prevented.

The fifth means is able to prevent damage occurring due to commutation of a strong electric current into the semiconductor switch.

Since the sixth means has a structure that latching of the breaker is suspended by two methods consisting of a method in which latching is suspended by the first suspending means and a method in which latching is suspended by the second suspending means depending upon the flowing electric current, time taking for the breaker to interrupt an electric circuit in accordance with the value of the electric current can be controlled.

Other and further objects, features and advantage of the invention will be appear more fully from the following description.

DETAILED DESCRIPTION OF THE PREFERRED EMBODIMENTS

Preferred embodiments of the present invention will now be described with reference to the drawings.

A first embodiment of the present invention will now be described with reference to FIGS. 1 to 6.

Figure 1:
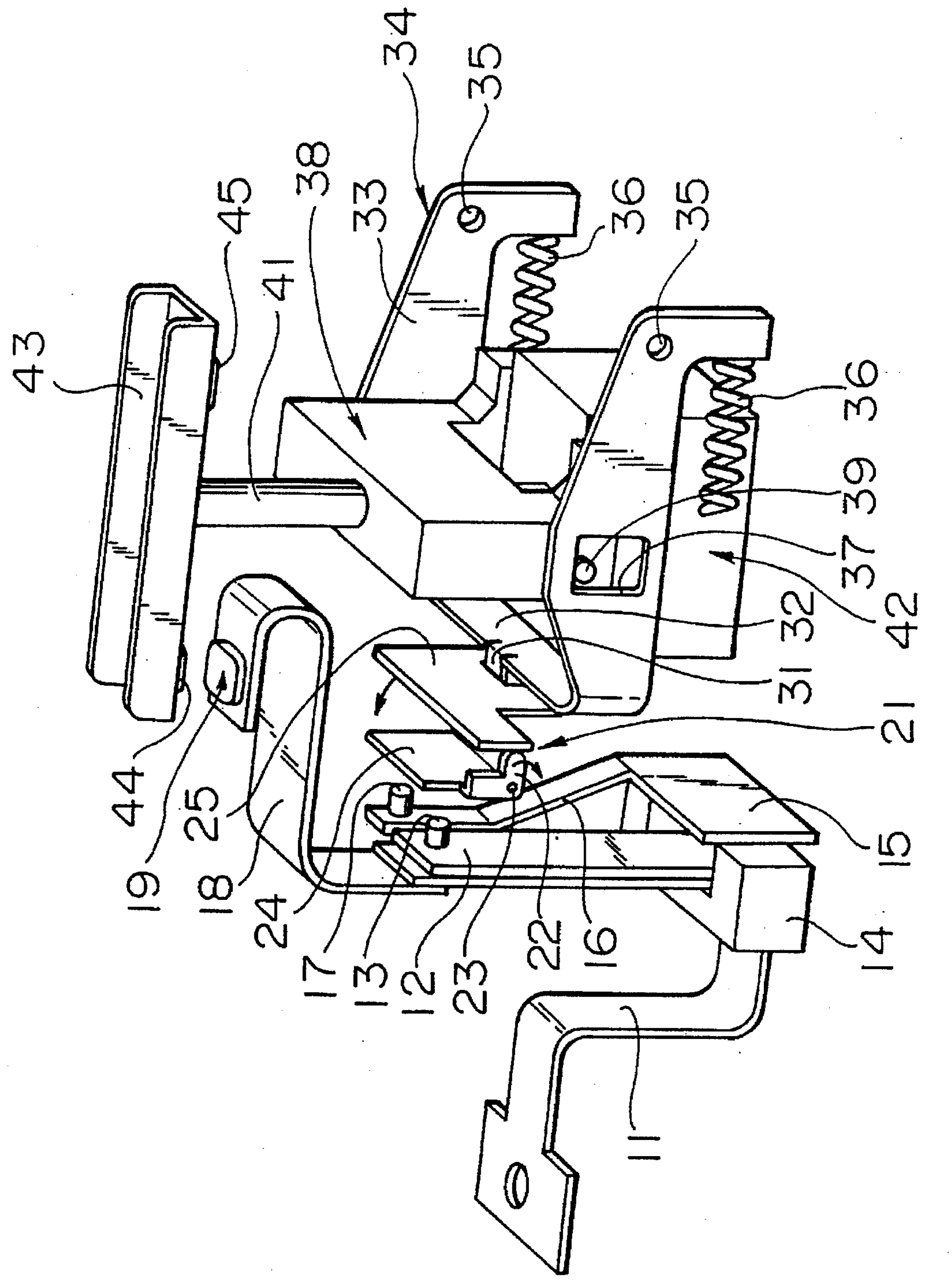
FIG. 1 is a perspective view showing the schematic mechanical structure of a first embodiment of a switch including a breaker according to the present invention in a state where a case has been removed.
Figure 2:
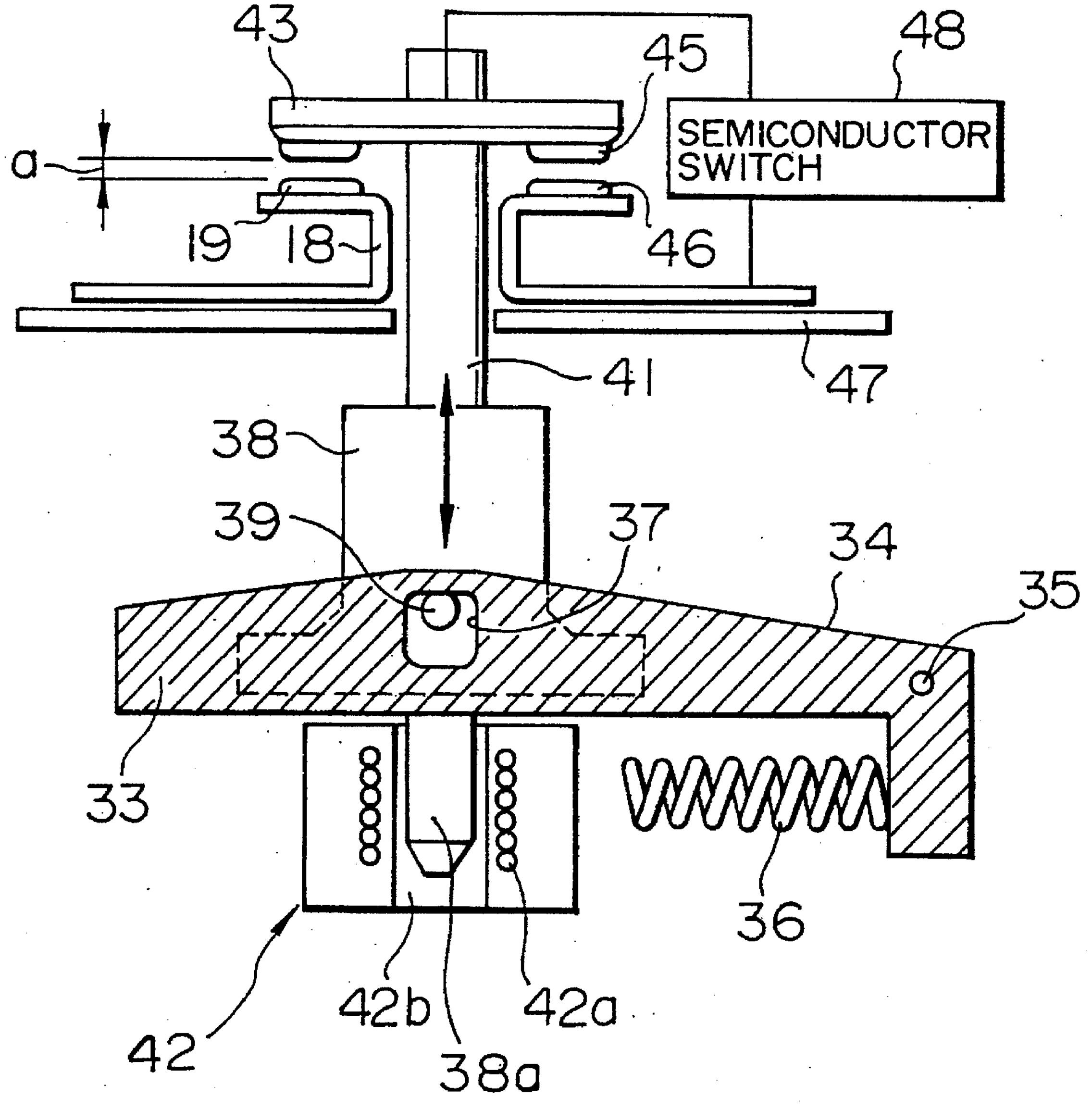
FIG. 2 is a schematic circuit diagram showing the electrical structure of the switch including a breaker.
Figure 3:
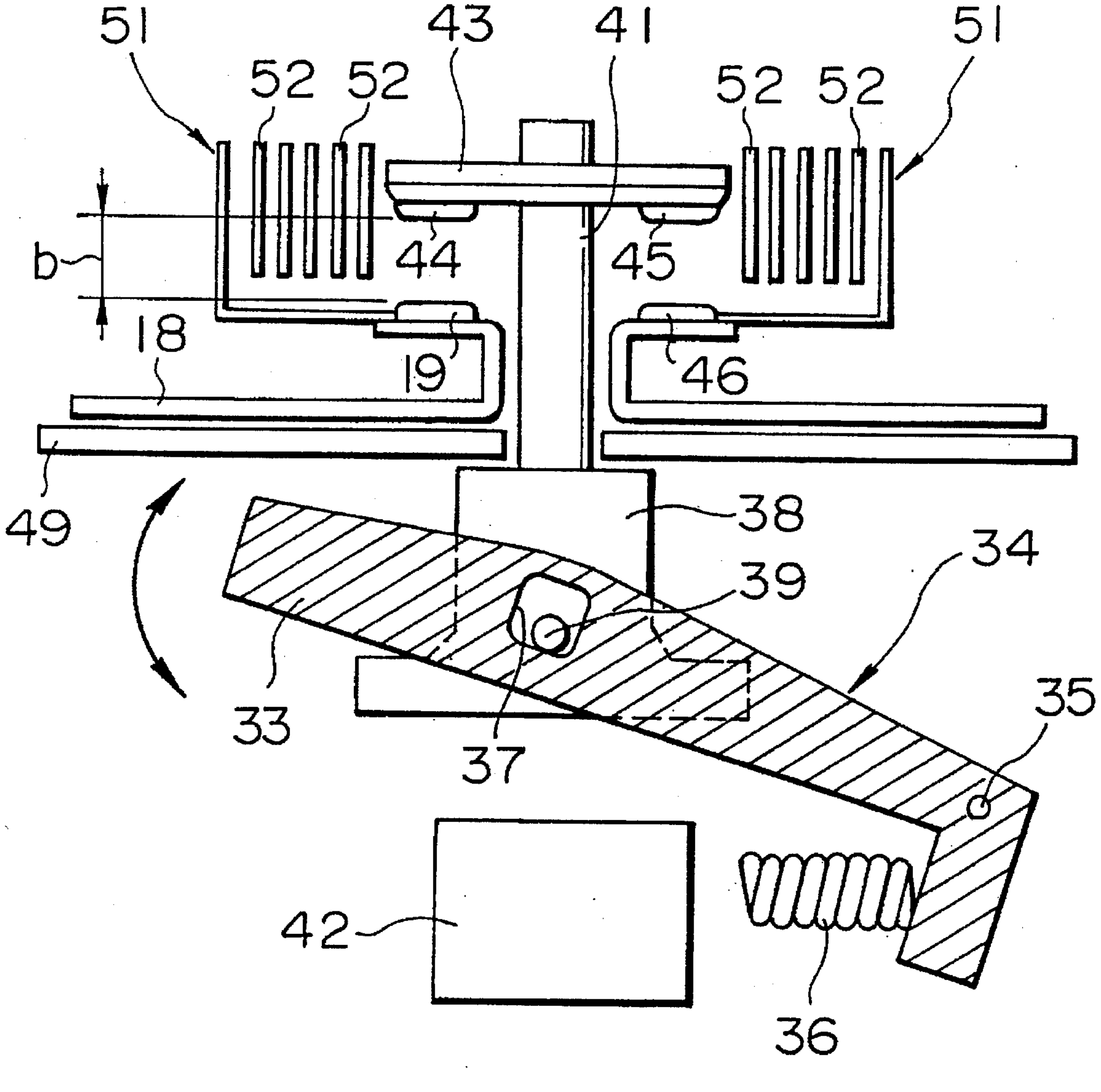
FIG. 3 is a side view showing a release state realized in a contact mode of the switch including a breaker.
Figure 4:
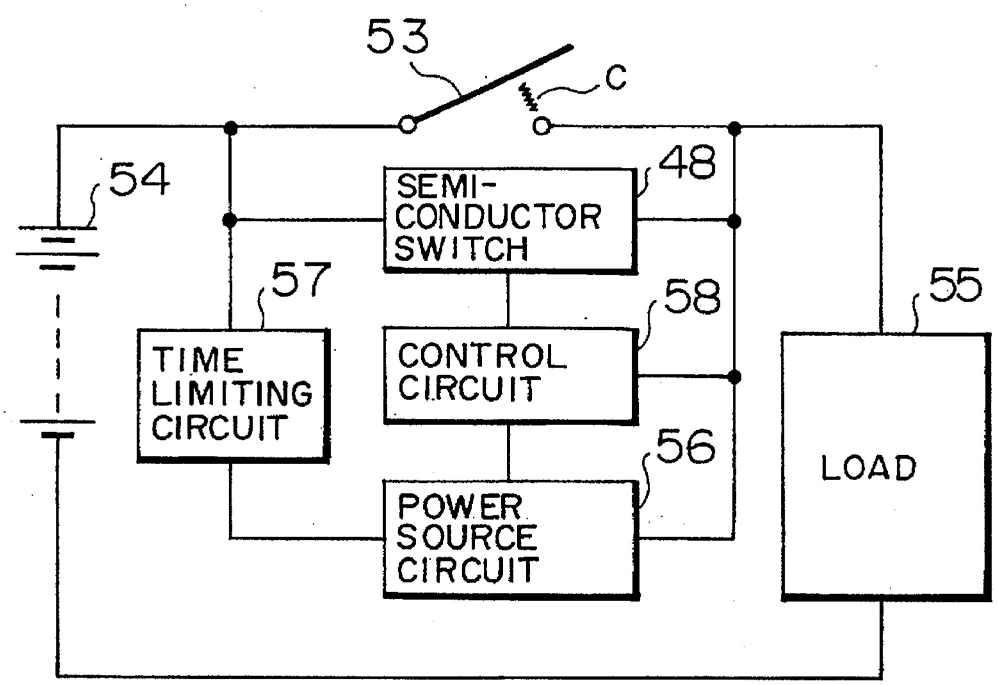
FIG. 4 is a side view showing a release state realized in a breaker mode of the switch including a breaker.
Figure 5:
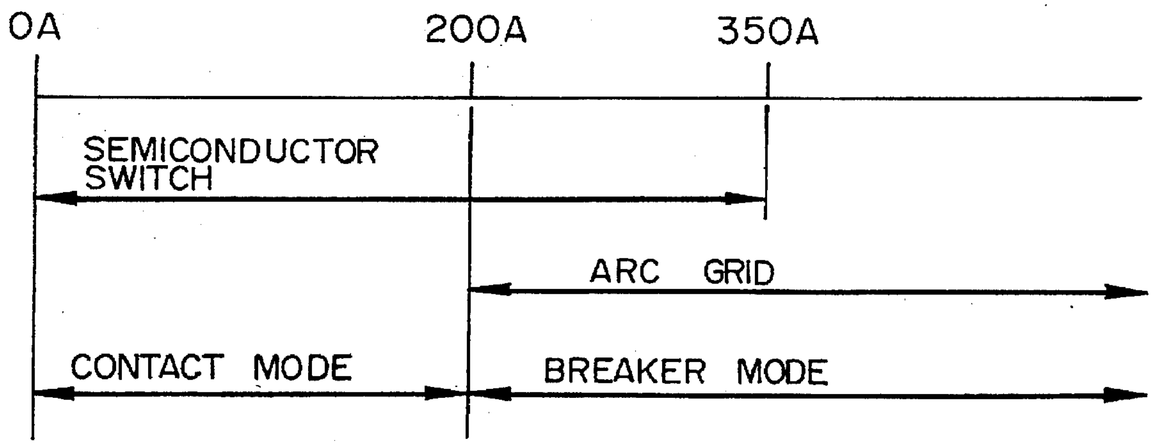
FIG. 5 is a graph of a range of electric currents flowing in the contact mode and the breaker mode in the first embodiment.
Figure 6:
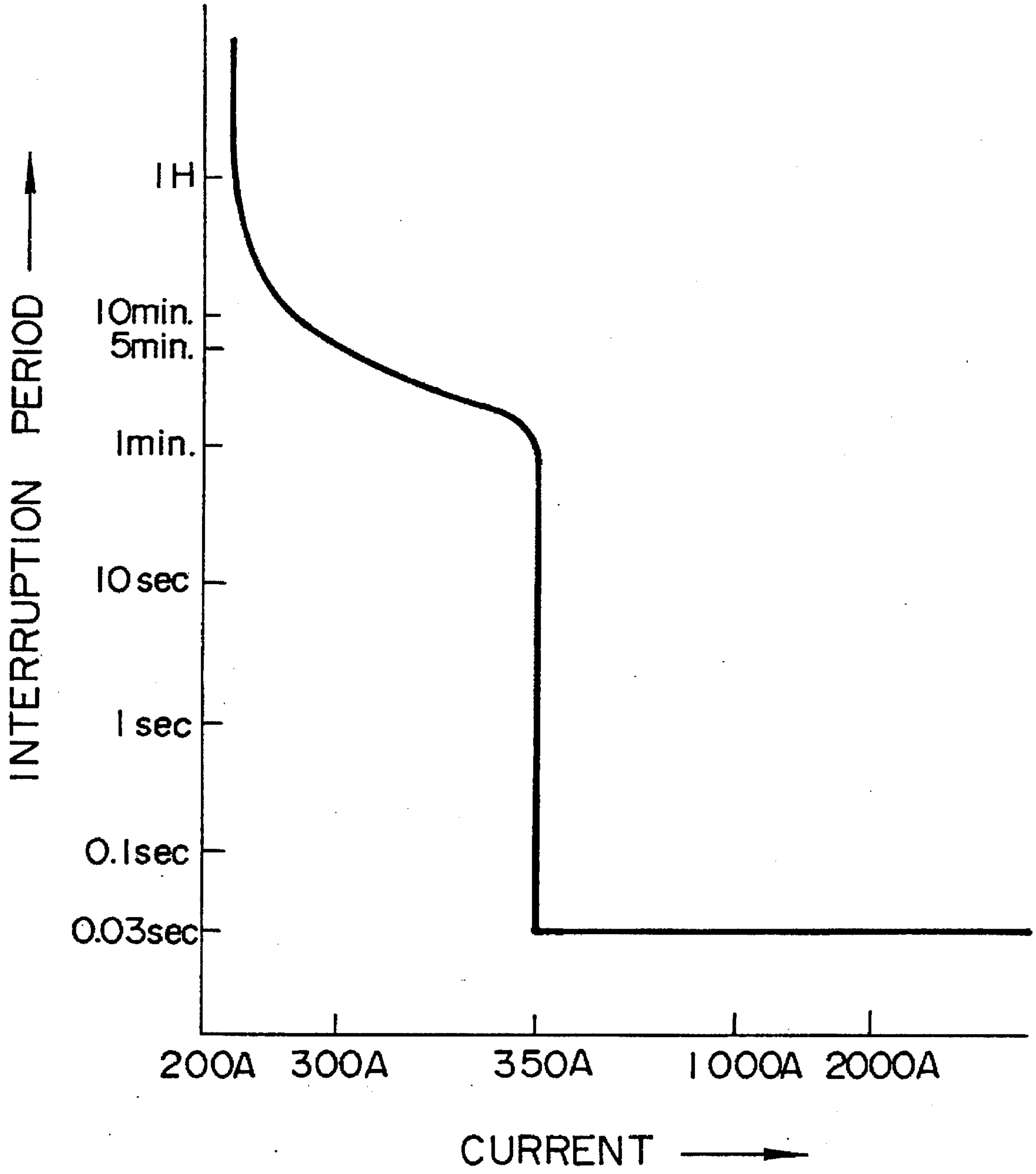
FIG. 6 is a graph of an electric current and time taking to interrupt the circuit.

FIG. 1 is a perspective view showing the schematic mechanical structure of a switch including a breaker according to the present invention in a state where a case has been removed. FIG. 2 is a side view showing a release state realized in a contact mode of the switch including a breaker. FIG. 3 is a side view showing a release state realized in a breaker mode of the switch including a breaker. FIG. 4 is a circuit diagram showing the electrical structure of the switch including a breaker. FIG. 5 is a graph of a range of electric currents flowing in the contact mode and the breaker mode. FIG. 6 is a graph of an electric current and time taking to interrupt the circuit.

Initially, the mechanical structure of the switch including a breaker will now be described with reference to FIGS. 1 and 3. A plate-like bimetal 12 is disposed along a heater element 11 comprising a copper plate or the like and forming a current passage in such a manner that the surface of the bimetal 12 is in contact with the surface of the heater element 11, the bimetal 12 being bent to the right, when viewed in FIG. 1, due to heat generated by the heater element 11. The lower portion of the bimetal 12 is secured to the heater element 11. The bimetal 12 has a leading end to which an end of a projection 13 is secured. The heater element 11 is provided with an electromagnet 14 made of low-carbon steel or the like and arranged to be urged by an electric current flowing through the heater element 11. An end of a steel-plate member 15 is disposed to face the electromagnet 14 in such a manner that the steel-plate member 15 is magnetically attracted by the electromagnet 14 when the electromagnet 14 is urged electrically. A support shaft 16 is attached to the central portion of the steel-plate member 15, the support shaft 16 being rotatively supported by a fixing member (not shown). The steel-plate member 15 is disposed in such a manner that its other end runs parallel to the leading end of the bimetal 12 and their surfaces are located on the same plane. The foregoing end running parallel to the leading end of the bimetal 12 has a projection 17 secured thereto and formed similarly to the projection 13. As a result, when the electromagnet 14 is urged and magnetically attracts the end of the steel-plate member 15, the steel-plate member 15 rotates clockwise, when viewed in FIG. 1, relative to the support shaft 16. An end of a contact support plate 18 formed by a conductive plate member is attached to an end of the heater element 11, while a fixed contact 19 for a breaker is attached to another end of the contact support plate 18.

A latch unit 21 is disposed to usually face the ends of the projections 13 and 17 in such a manner that a certain interval is maintained. The latch unit 21 comprises a first plate member 24 having a cam projection 22 on a side portion thereof and so supported by a fixing member (not shown) that the first plate member 24 is able to rotate relative to a support shaft 23; and a second plate member 25 so urged by an appropriate means, such as a spring, as to be capable of rotating counterclockwise. The latch unit 21 is structured in such a manner that, after the breaker has been set, the cam projection 22 is, as shown in FIG. 1, engaged to the surface of the second plate member 25 to prevent counterclockwise rotation of the second plate member 25. When the first plate member 24 is rotated clockwise when viewed in FIG. 1, the engagement between the cam projection 22 and the second plate member 25 is suspended so that the second plate member 25 is rotated toward the first plate member 24.

A spring-up lever 34 is disposed to face the surface of the second plate member 25 opposing the first plate member 24, the spring-up lever 34 consisting of a front portion 32 having an engagement portion 31 formed in the central portion thereof and arranged to be engaged to the surface of the second plate member 25; and side portions 33 extending substantially perpendicular to the two ends of the front portion 32. The two ends of the side portions 33 opposing the front portion 32 are rotatively supported by a fixing member (not shown) by a support shaft 35. Ends of release springs 36, the other ends of which are attached to a fixing member (not shown), are attached to the ends of the side portions 33. The foregoing release springs 36 elastically urge the spring-up lever 34 in such a manner that the spring-up lever 34 is rotated clockwise, when viewed in FIG. 1, relative to the support shaft 35. Each of the side portions 33 has an elongated hole 37 formed vertically when viewed in FIG. 1. Pins 39 of a slide portion 38 are loosely inserted into the hole 37.

The slide portion 38 is formed by insulating material. An end of a support column 41 is attached to substantially the central portion of an end surface of the slide portion 38. A solenoid 42 for controlling the switch to switch on/off is disposed adjacent to another end of the slide portion 38 in such a manner that a predetermined interval is maintained. When a coil 42*a* of the solenoid 42 is magnetically activated, a plunger 38*a* of the slide portion 38 is magnetically attracted within a hole 42*b* into a downward direction when viewed in FIG. 1. The central portion of a contact support member 43 formed by conductive material in the form of a gutter is perpendicularly attached to a leading end of the support column 41, the leading end being another end. A moveable contact 44 is so attached to an end of the contact support member 43 to face the fixed contact 19. Another moveable contact 45 is attached to another end of the contact support member 43. The moveable contact 45 faces another fixed contact 46 as shown in FIGS. 2 and 3. Between the fixed contact 46 and the contact support member 43, there is connected a semiconductor switch 48 as shown in FIG. 2. Reference numeral 47 represents a support plate for slidably supporting the support column 41, the support plate having ends secured to a case or the like (not shown).

As described above, the fixed contacts 19 and 46 and the moveable contacts 44 and 45 form the mechanical switch and serve as contacts of the breaker.

An arc runner 51 (not shown in FIGS. 1 and 2) is provided for each of the contact support plates 18 and 47 as shown in FIG. 3. A plurality of arc grids 52 are disposed between positions, to which the moveable contacts 44 and 45 have been moved upwards to interrupt the circuit, and the foregoing arc runners 51 to extinguish an arc which can be generated when the circuit has been interrupted due to the operation of the breaker.

The electrical structure of the switch including a breaker will now be described with reference to FIG. 4. The foregoing mechanical switch, which is given reference numeral 53, is connected between a DC power source 54 and a load 55. To extinguish an arc which can be generated when the mechanical switch 53 is switched on or off, a semiconductor switch 48 is connected in parallel to the mechanical switch 53. A power source circuit 56 for the semiconductor switch 48 is connected to the semiconductor switch 48 through a time limiting circuit 57 arranged in such a manner that conduction for a predetermined period is enabled if generation of arc results in falling of the voltage. Between the semiconductor switch 48 and the power source circuit 56, there is connected a control circuit 58 for controlling the semiconductor switch 48 to switch on or off. Thus, the mechanical switch 53 and the semiconductor switch 48 form a hybrid contactor.

The operation of the switch including a breaker will now be described.

In this embodiment, the range for electric currents flowing in each mode shown in FIG. 5 is set in such a manner that the contact mode is realized if the electric current is weaker than 200A and the breaker mode is realized if the electric current is stronger than 200A. If the electric current is not stronger than 350A, the time required to interrupt the circuit is made to be different depending upon the value of the electric current in accordance with the time in which an electric current flows and which is realized by the bimetal 12, as shown in FIG. 6 which illustrates an electric current and time taken to interrupt the electric current.

In a normal state, the spring-up lever 34 is, by the latch unit 21, brought to the position shown in FIGS. 1 and 2. That is, the cam projection 22 provided for the first plate member 24 of the latch unit 21 is engaged to the second plate member 25 so that further movement of the second plate member 25 toward the first plate member 24 is limited. Therefore, the engagement portion 31 of the spring-up lever 34 is engaged to the surface of the second plate member 25 so that further clockwise rotation of the spring-up lever 34 relative to the support shaft 35 is prevented. As a result, the fixed contacts 19 and 46 and the moveable contacts 44 and 45 face each other in such a manner that a small gap a is maintained so that the state where the mechanical switch 53 is switched off is maintained. To switch the mechanical switch 53 on, the solenoid 42 is magnetically activated to magnetically attract the slide portion 38 in the downward direction when viewed in FIG. 2. If the solenoid 42 is activated in the state shown in FIG. 2, the slide portion 38 can be magnetically attracted in the downward direction until the pin 39 is engaged to the lower edges of the holes 37. Thus, the slide portion 38 is required to be vertically moved by the solenoid 42 to bring the moveable contacts 44 and 45 into contact with the fixed contacts 19 and 46 within the foregoing stroke.

When the mechanical switch 53, which has been switched off, is switched on, approaching of the moveable contacts 44 and 45 toward the fixed contacts 19 and 46 results in generation of arc C. If arc C is generated, voltage drop takes place between the moveable contacts 44 and 45 and the fixed contacts 19 and 46. The voltage drop causes the time limiting circuit 57 to be operated so that a conductive state is realized for a predetermined period. As a result, the power source circuit 56 is brought to a state where the power source circuit 56 has voltage, thus causing the power source circuit 56 to operate the control circuit 58 to switch the semiconductor switch 48 on. Since the semiconductor switch 48 is switched on, an electric current flows through the semiconductor switch 48 so that arc C generated by the mechanical switch 53 is extinguished and the mechanical switch 53 is switched on. Since the impedance of the mechanical switch 53 is smaller than that of the semiconductor switch 48, switching on of the mechanical switch 53 results in flowing of an electric current through the mechanical switch 53. As a result, the potentials at the two ends of the mechanical switch 53 are made to be substantially the same so that the power source circuit 56 has no voltage. Accordingly, the control circuit 58 is not operated and thus the semiconductor switch 48 is switched off.

When the mechanical switch 53, which has been switched on, is switched off and arc is generated considerably, somewhat spacing of the moveable contacts 44 and 45 away from the fixed contacts 19 and 46 results in generation of arc C. If arc C is generated, voltage drop takes place between the moveable contacts 44 and 45 and the fixed contacts 19 and 46, similarly to the foregoing case. The voltage drop causes the time limiting circuit 57 to be operated so that conduction is performed for a predetermined period. Then, the power source circuit 56 has voltage, thus causing the power source circuit 56 to operate the control circuit 58. As a result, the control circuit 58 switches the semiconductor switch 48 on. When the semiconductor switch 48 is switched on, an electric current flows through the semiconductor switch 48. Thus, arc C in the mechanical switch 53 is extinguished, and the mechanical switch 53 is switched off. Then, the time limiting circuit 57 stops its operation after a sufficiently long time passes from the moment the mechanical switch 53 has been switched off. Therefore, the power source circuit 56 has no voltage and, therefore, the control circuit 58 is not operated. Accordingly, the semiconductor switch 48 is switched off. Since the power source circuit 56 is, as described above, activated to operate the control circuit 58 so as to switch the semiconductor switch 48 on only when arc C has been generated in the mechanical switch 53, the necessity of always supplying electric power to the power source circuit 56 can be eliminated, thereby saving electric power.

Then, description will now be described about the operation to be performed if an excess current flows due to, for example, short circuit of the load 55 when the mechanical switch 53 is in the contact mode. An assumption is made here that an electric current stronger than 200A and not stronger than 350A flows. The generated excess current causes the heater element 11 to gradually generate heat. Heat thus generated deforms the bimetal 12 in such a manner that the bimetal 12 is bent to the right when viewed in FIG. 1. Since the bimetal 12 is bent as described above, the projection 13 at the leading end of the bimetal 12 is brought into contact with the first plate member 24 of the latch unit 21, thereby clockwise rotating the first plate member 24. Thus, counterclockwise rotation of the second plate member 25 due to the cam projection 22 of the first plate member 24 is prevented and the second plate member 25 is rotated toward the first plate member 24. As a result, the spring-up lever 34, the rotation of which has been inhibited due to engagement with the second plate member 25, is rotated by the release springs 36 as shown in FIG. 3 and upwards move the slide portion 38. Thus, the contact between the moveable contacts 44 and 45 and the fixed contacts 19 and 46 is suspended, resulting in that the circuit is interrupted. The moveable contacts 44 and 45 and the fixed contacts 19 and 46 face one another in such a manner that gap b, which is larger than gap a, is maintained as shown in FIG. 3. Setting of the time taken to interrupt the circuit to be longer if the electric current is weak and to be shorter as the value of the electric current approaches 350A enables undesirable instantaneous interruption to be prevented even if a somewhat strong excess current flows. If an excess current stronger than 350A flows, the electromagnet 14 is magnetically activated before the bimetal 12 is deformed, thus attracting the lower end of the steel-plate member 15 and clockwise rotating the steel-plate member 15 relative to the support shaft 16. The projection 17 formed at the leading end of the steel-plate member 15 clockwise rotates the first plate member 24 so that the circuit is interrupted similarly to the aforementioned description. A quarter degree of turning of the heater element 11 serving as the current passage with respect to the magnetic core of the electromagnet 14 is sufficient to satisfactory attract the steel-plate member 15 if the electric current is strong enough.

Although arcs are similarly generated when the circuit is interrupted, the generated arcs can be extinguished by the arc grids 52. That is, arcs initially fly between the moveable contacts 44 and 45 and the fixed contacts 19 and 46. When the moveable contacts 44 and 45 are rapidly separated from the fixed contacts 19 and 46, the arcs are separated from the fixed contacts 19 and 46 but the same fly between the moveable contacts 44 and 45 and the arc runners 51. Since the plurality of arc grids 52 are disposed between the moveable contacts 44 and 45, which have been moved upwards, and the arc runners 51, the arc can be sectioned into pieces by the arc grids 52, thereby rapidly extinguishing the arcs. Since the arc grids 52 can be cooled easily, the arcs can easily be extinguished if the temperature has been lowered.

A second embodiment of the present invention will now be described.

Figure 7:
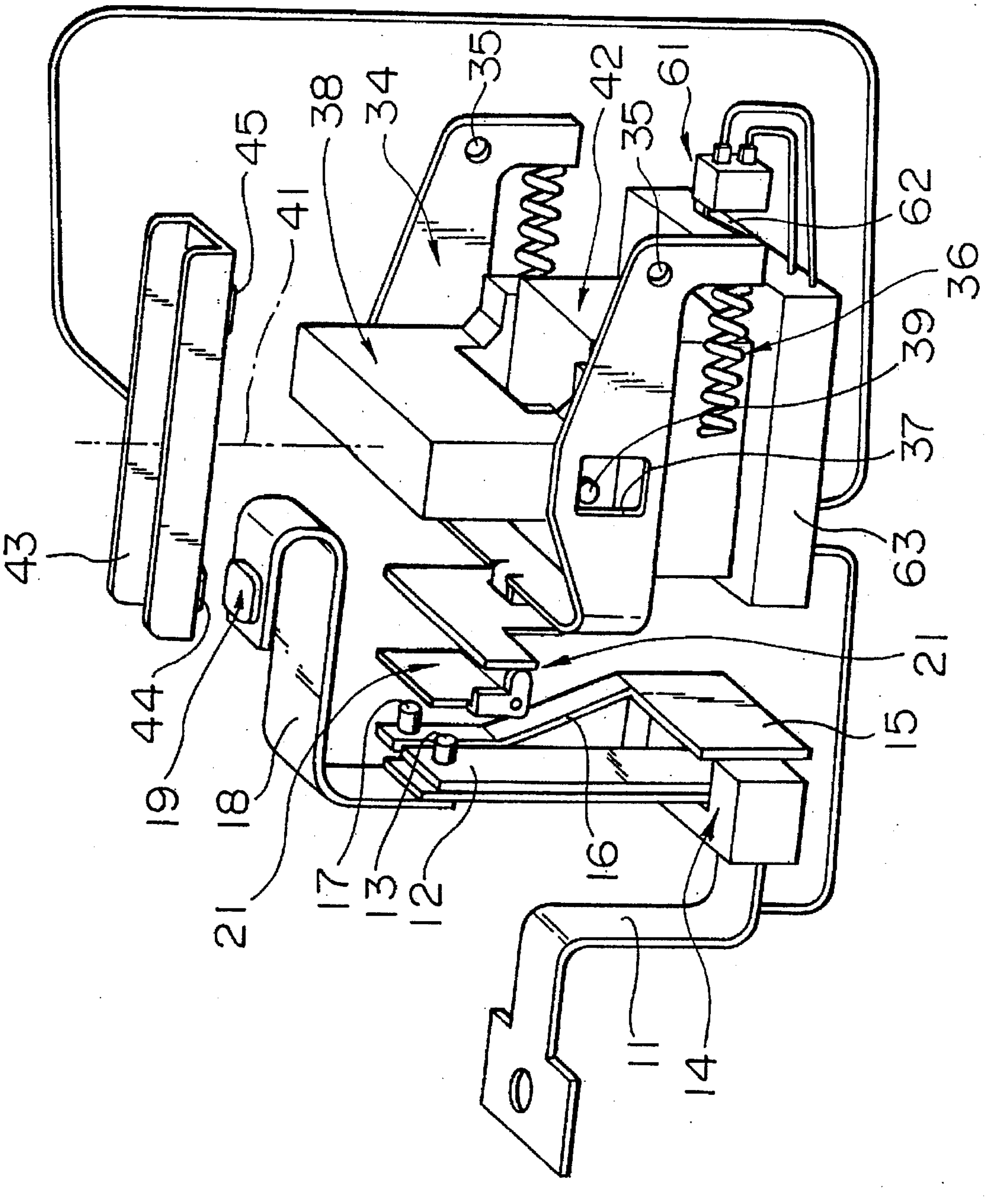
FIG. 7 is a perspective view showing the schematic mechanical structure of a second embodiment of a switch including a breaker according to the present invention in a state where a case has been removed.

FIG. 7 is a perspective view showing the mechanism structure of a second embodiment of the switch including a breaker according to the present invention from which the case has been removed.

The second embodiment has a structure such that the semiconductor switch 48 is rapidly switched off when the circuit is interrupted.

In the second embodiment, a microswitch 61 is disposed at an end of one of the side portions 33 of the spring-up lever 34, the end being adjacent to the support shaft 35. When the contact mode shown in FIG. 7 has been realized, the end of the side portion 33 is engaged to a lever 62 of the microswitch 61 to switch the microswitch 61 on. Thus, the latch unit 21 of the spring-up lever 34 is operated and, thus, the spring-up lever 34 is rotated, so that the engagement between the side end of the side portion 33 and the lever 62 is suspended. As a result, the microswitch 61 is switched off. The microswitch 61 switches the semiconductor switch 48 off and turns the control circuit 58 off, thereby switching the semiconductor switch 48 off. Reference numeral 63 represents a package accommodating the semiconductor switch 48 and the control circuit 58.

Figure 8:
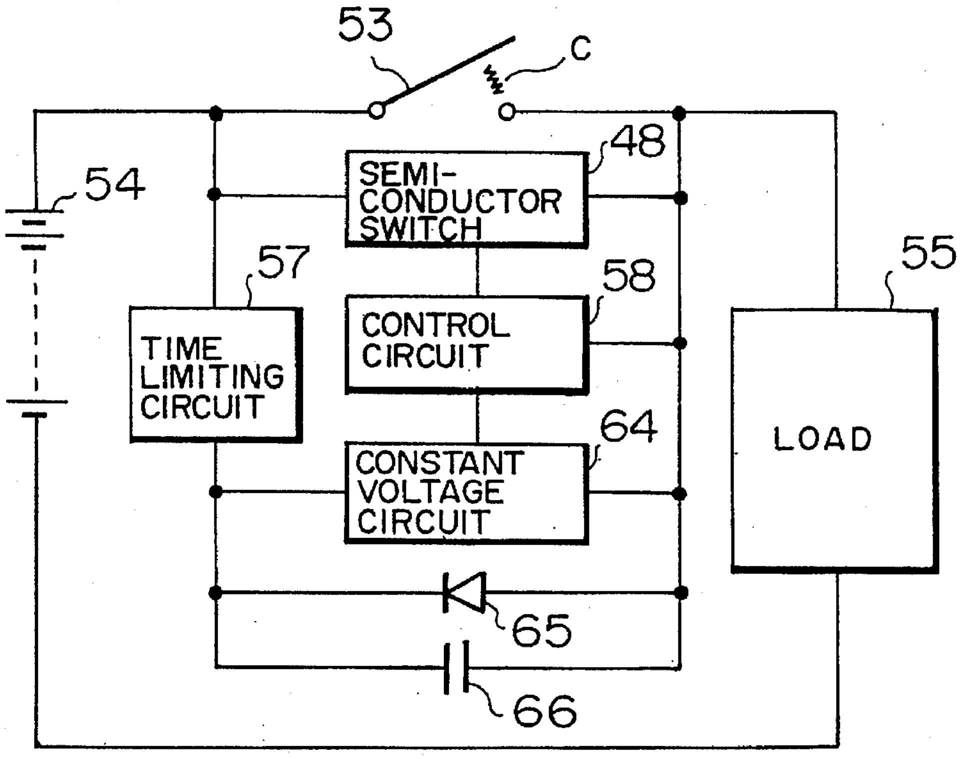
FIG. 8 is a schematic circuit diagram showing the electrical structure of another embodiment of the switch including a breaker according to the present invention.
Figure 9:
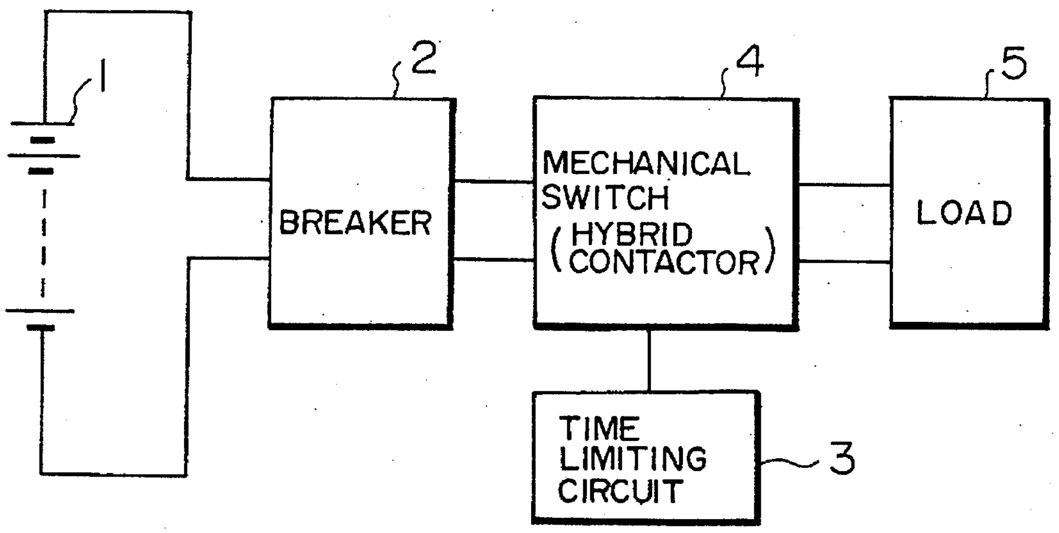
FIG. 9 is a block diagram showing an example of a conventional control circuit of an electric car.

A circuit shown in FIG. 8 is a modification of the circuit shown in FIG. 4 structured such that a constant-voltage circuit 64 is connected in place of the power source circuit 56; and a parallel circuit consisting of a diode 65 and a capacitor 66 is connected in parallel to the constant-voltage circuit 64. The parallel connection of the capacitor 66 to the constant-voltage circuit 64 enables the voltage to be maintained for a short time even after the contact of the mechanical switch 53 has been disconnected, thereby switching the semiconductor switch 48 on for the short time. The reason for this is that an arc is again generated in the mechanical switch 53 if the semiconductor switch 48 is switched off at a moment the arc in the mechanical switch 53 has been extinguished. Thus, re-generation of arc can be prevented.

Since the time limiting circuit 57, the semiconductor switch 48 and the diode 65 form a loop in this embodiment, the charge stored in the capacitor of the time limiting circuit 57 can be allowed to quickly flow through the diode 65.

According to the present invention, the contacts are employed to serve as contacts for turning an electric circuit on/off and contacts for interrupting the electric circuit. Therefore, a switch including a breaker can be provided which exhibits small size, simple structure and low cost as compared with a conventional structure in which a breaker and a mechanical switch, which are individually prepared, are combined to each other.

According to the present invention, the structure is arranged in such a manner that the switch consists of the mechanical switch 53 and the semiconductor switch 48 connected in parallel to the mechanical switch 53. Thus, if an arc is generated in the mechanical switch 53, then the semiconductor switch 48 is immediately switched on to prevent further generation of an arc in the mechanical switch 53.

Since the structure according to the present invention is arranged in such a manner that the distance between the contacts of the breaker, realized when the breaker is operated, is set to be longer than the distance between the contacts of the switch, realized when the switch is switched off, the interrupting performance of the breaker can be improved and electric power required to switch the mechanical switch on/off can be reduced to decrease electric power consumption.

According to the present invention, the structure that the plurality of arc-extinguishing conductor plates 52 are disposed between the contacts which are located when the breaker is turned off so that an arc generated between the contact electrodes when the switch including a breaker is operated as a breaker can be allowed to flow outwardly through the conductive plates 52. Thus, generation of an arc, when the breaker is operated, can reliably be prevented and, thus, damage due to an arc generated between the contact electrodes can be prevented.

According to the present invention, the structure that the semiconductor switch 48 is synchronously switched off when the breaker is turned off enables damage occurring due to commutation of a strong electric current into the semiconductor switch 48 to be prevented.

Since the structure according to the present invention comprises the first suspending means consisting of latch means 21 for maintaining a state where the breaker is turned on and the bimetal means 12 disposed in a current passage for the latch means 21 and arranged to be deformed due to a flowing electric current so as to suspend a latching operation of the latch means 21; and the second suspending means formed by the electromagnet 14 which is urged by the electric current flowing through the current passage to suspend the latching operation of the latch means 21, wherein latching of the breaker is suspended by two methods consisting of a method in which latching is suspended by the first suspending means and a method in which latching is suspended by the second suspending means. The realized structure that latching of the breaker is suspended by two methods consisting of a method in which latching is suspended by the first suspending means and a method in which latching is suspended by the second suspending means enables time taking for the breaker to interrupt an electric circuit in accordance with the value of the electric current to be controlled.

The structure according to a first aspect is arranged in such a manner that the common contacts for the breaker and the mechanical switch are employed. Thus, a switch including a breaker can be provided which exhibits small size, simple structure and low cost as compared with a conventional structure in which a breaker and a mechanical switch, which are individually prepared, are combined to each other.

In accordance with a second aspect, if an arc is generated in the mechanical switch thereof, then the semiconductor switch is immediately switched on to prevent further generation of an arc in the mechanical switch.

The structure according to a third aspect is arranged in such a manner that the distance between the contacts, realized when the breaker is turned off, is made to be long and the distance, realized when the mechanical switch is switched off, is made to be short so that the interrupting performance of the breaker is improved and electric power required to switch the mechanical switch on/off is reduced to decrease electric power consumption.

Since the structure according to a fourth aspect is arranged in such a manner that an arc generated between the contact electrodes when the switch including a breaker is operated as a breaker can be allowed to flow outwardly through the conductive plate so that generation of an arc, when the breaker is operated, is reliably prevented and, thus, damage due to an arc generated between the contact electrodes is prevented.

The structure according to a fourth aspect is able to prevent damage occurring due to commutation of a strong electric current into the semiconductor switch.

Since the structure according to a sixth aspect has a structure that latching of the breaker is suspended by two methods consisting of the method in which latching is suspended by the first suspending means and the method in which latching is suspended by the second suspending means depending upon the flowing electric current, time taking for the breaker to interrupt an electric circuit in accordance with the value of the electric current can be controlled.

Although the invention has been described in its preferred form with a certain degree of particularity, it is understood that the present disclosure of the preferred form can be changed in the details of construction and in the combination and arrangement of parts without departing from the spirit and the scope of the invention as hereinafter claimed.

What is claimed is:

1. A switch including a breaker, comprising:

a mechanical switch including first and second contacts commonly serving as contacts for turning an electric circuit on/off in response to a switching signal and contacts for interrupting said electrical circuit when said breaker is operated; and a semiconductor switch connected in parallel to said mechanical switch;

wherein a power source for turning on the semiconductor switch is generated by a voltage drop caused by arcing across said first and second contacts.

2. A switch including a breaker according to claim 1, wherein a first distance between said first and second contacts, realized when said breaker is operated, is set to be longer than a second distance between said first and second contacts of said mechanical switch, realized when said mechanical switch is switched off.

3. A switch including a breaker according to claim 1, wherein a plurality of arc-extinguishing conductor plates are located between said first and second contacts.

4. A switch including a breaker according to claim 1, wherein said semiconductor switch is synchronously switched off when said breaker is turned off.

5. A switch including a breaker according to claim 1, further comprising:

first suspending means consisting of latch means for maintaining a state where said breaker is turned on and bimetal means disposed in a current passage for said latch means and arranged to be deformed due to a flowing electric current so as to suspend a latching operation of said latch means; and second suspending means formed by an electromagnet which is urged by the electric current flowing through the current passage to suspend the latching operation of said latch means, wherein latching of said breaker is suspended by two methods consisting of a method in which latching is suspended by said first suspending means and a method in which latching is suspended by said second suspending means.

6. A breaker switch for connecting a load to a power source, the breaker switch comprising:

a mechanical switch having a first contact connected to the load and a second contact connected to the power source;

a semiconductor switch connected in parallel with the mechanical switch, the semiconductor switch including a control terminal; and means connected in parallel with the mechanical switch for applying a control signal to the control terminal of the semiconductor switch in response to a voltage drop caused by arcing between the first and second terminals, wherein the control signal causes the semiconductor switch to conduct, thereby suppressing the arcing between the first and second terminals.

7. The breaker switch of claim 6, wherein the means for applying comprises:

a time limiting circuit connected to the first terminal;

a power source circuit connected to the time limiting circuit and to the second terminal, the power source circuit generating a voltage during the arcing between the first and second terminals; and a control circuit for applying the control signal to the semiconductor switch in response to the voltage generated by the power source circuit.

8. The breaker switch of claim 6, wherein the first contact is mounted on a slide member and the second contact is mounted on a contact support plate, wherein the breaker switch further comprises:

a solenoid connected to the slide member for moving the first contact into contact with the second contact in response to a first signal, and for biasing the first contact a first distance away from the second contact in an absence of the first signal; and a bimetal member connected to the second contact, the bimetal member deforming from a normal shape to a deformed shape when a current passing through the bimetal member is greater than a predetermined maximum current; and a breaker mechanism connected to the slide member for biasing the first contact a second distance away from the second contact when the bimetal member is in the deformed shape;

wherein the predetermined second distance is greater than the first distance.

9. The breaker switch of claim 6, wherein the first contact is mounted on a slide member and the second contact is mounted on a contact support plate, wherein the breaker switch further comprises:

a solenoid connected to the slide member for moving the first contact into contact with the second contact in response to a first signal, and for biasing the first contact a first distance away from the second contact in an absence of the first signal; and an electromagnet connected to the second contact, the electromagnet generating a magnetic field when a current passing through the bimetal member is greater than a predetermined maximum current; and a breaker mechanism connected to the slide member for biasing the first contact a second distance away from the second contact when the electromagnet generates the magnetic field;

wherein the predetermined second distance is greater than the first distance.

10. A switch including a breaker according to claim 6, wherein a plurality of arc-extinguishing conductor plates are connected between the first and second contacts.

* * * * *

UNITED STATES PATENT AND TRADEMARK OFFICE
CERTIFICATE OF CORRECTION

PATENT NO. : 5,638,038
DATED : June 10, 1997
INVENTOR(S) : Kazuo Suzuki and Shinji Sasaki It is certified that error appears in the above-identified patent and that said Letters Patent is hereby corrected as shown below:

Column 10, line 15
Delete "in response to a switching signal"

Signed and Sealed this

Seventeenth Day of March, 1998

*Attest:*

Bruce Lehman

BRUCE LEHMAN

*Attesting Officer*

*Commissioner of Patents and Trademarks*